(12) United States Patent
Sasaki (10) Patent No.: US 7,978,968 B2
(45) Date of Patent: Jul. 12, 2011

(54) AUTO FOCUS DEVICE

(75) Inventor: Tadashi Sasaki, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 0 days.

(21) Appl. No.: 12/541,387

(22) Filed: Aug. 14, 2009

(65) Prior Publication Data

US 2010/0074606 A1    Mar. 25, 2010

(30) Foreign Application Priority Data

Sep. 22, 2008  (JP) ............................... P2008-242940
Feb. 4, 2009   (JP) ............................... P2009-023836

(51) Int. Cl.
  *G03B 13/34*  (2006.01)
(52) U.S. Cl. ..................................................... 396/121
(58) Field of Classification Search ........... 396/121–124
  See application file for complete search history.

(56) References Cited

U.S. PATENT DOCUMENTS

| | | | |
|---|---|---|---|
| 6,157,782 A | 12/2000 | Aoyama | |
| 2005/0189419 A1* | 9/2005 | Igarashi et al. | 235/454 |
| 2007/0009251 A1 | 1/2007 | Koskinen | |
| 2007/0019940 A1* | 1/2007 | Sasaki | 396/121 |
| 2008/0131109 A1 | 6/2008 | Honjo et al. | |

FOREIGN PATENT DOCUMENTS

| | | |
|---|---|---|
| EP | 1 471 455 A2 | 10/2004 |
| JP | 2006-109199 | 4/2006 |
| JP | 2007-25595 A | 2/2007 |

* cited by examiner

*Primary Examiner* — W. B. Perkey
*Assistant Examiner* — Dennis Hancock
(74) *Attorney, Agent, or Firm* — Birch, Stewart, Kolasch & Birch, LLP

(57) ABSTRACT

Disclosed is an auto focus device that automatically and easily sets an AF frame to a focus range desired by a cameraman in an AF system.

An auto focus device includes: a focusing unit that performs focusing on an imaging screen of a camera; a best focus range detecting unit that detects a best focus range from the imaging screen showing the focus result of the focusing unit; and an AF frame automatic setting unit that automatically sets the position of an AF frame indicating the range of an AF area, which is a target range focused by auto focus in the imaging screen, in the detected best focus range.

9 Claims, 7 Drawing Sheets

AUTO FOCUS DEVICE

CROSS-REFERENCE TO RELATED APPLICATIONS

This application is based upon and claims the benefit of priority from the Japanese Patent Application No. 2009-23836 filed on Feb. 4, 2009 and Japanese Patent Application No. 2008-242940 filed on Sep. 22, 2008; the entire contents of which are incorporated herein by reference.

BACKGROUND OF THE INVENTION

1. Field of the Invention

The present invention relates to an auto focus device, and more particularly, to an auto focus device that easily sets the position of an AF (auto focus) frame indicating a desired focus range in an auto focus system.

2. Description of the Related Art

In general, a contrast method has been used as an auto focus (hereinafter, referred to as AF) method. In the contrast method, the contrast of the image of an object captured by an imaging device is detected from the image signals (video signals) of the image of the object, and the focus of an imaging lens (focus lens) is controlled such that the contrast is the highest. In this way, focusing is automatically performed in the best focus state.

In contrast-type AF, in many cases, the imaging range (image capture range) of a camera is not the AF target range, but the target is just an object in one portion of the imaging range. For example, among the image signals of the image of the object effectively captured by the imaging device, the image signals in a predetermined range, which are an AF target, are extracted and focusing is controlled on the basis of the extracted image signals in the range such that the contrast of the image becomes the highest. In this way, the AF target is limited to the object in one portion of the imaging range.

In the specification, the AF target range is referred to as an AF area, a frame indicating the range of the AF area (the outline of the AF area) is referred to as an AF frame.

An AF system has been proposed which sets the position, size, or shape of the AF area. In the system, a cameraman operates, for example, a joystick to move the AF frame such that the AF frame overlaps an object in focus. That is, the cameraman performs a manual focus operation (for example, see JP-A-2007-25595).

However, it is inconvenient to set the AF area (AF frame) using a manual operation, as in the related art. Therefore, it is convenient that the AF frame be automatically set. However, when the AF frame is automatically set, there is a problem in that it is difficult to set the AF frame at the cameraman's intended position, and automatically setting the AF frame to a desired position is not easy.

SUMMARY OF THE INVENTION

The invention has been made in order to solve the above-mentioned problems, and an object of the invention is to provide an auto focus device capable of automatically and easily setting an AF frame to a focus range desired by a cameraman in an AF system and automatically moving the AF frame to follow the movement of an object when the object is moved on a screen.

In order to achieve the object, according to a first aspect of the invention, an auto focus device includes: a focusing unit that performs focusing on an imaging screen of a camera; a best focus range detecting unit that detects a best focus range from the imaging screen showing the focus result of the focusing unit; and an AF frame automatic setting unit that automatically sets the position of an AF frame indicating the range of an AF area, which is a target range focused by auto focus in the imaging screen, in the detected best focus range.

According to the above-mentioned structure, it is possible to automatically and easily set the AF frame to a focus range desired by a cameraman in an AF system.

According to a second aspect of the invention, the best focus range detecting unit may divide the imaging screen into a plurality of regions and acquire the focus state of each of the regions, thereby detecting the best focus range.

According to the above-mentioned structure, it is possible to accurately detect the best focus range.

According to a third aspect of the invention, the focus state of each of the regions may include a best focus state, a front focus state, a rear focus state, and an out-of-focus state.

According to the above-mentioned structure, it is possible to accurately detect the main object.

According to a fourth aspect of the invention, an imaging device may capture object light for detecting the focus state that is separated from object light incident on an imaging lens and generate a video signal, and the best focus range detecting unit may acquire the focus state on the basis of the focus evaluation value of the image of an object obtained on the basis of the video signal.

According to the above-mentioned structure, it is possible to accurately detect the main object even when there is an object having a contrast higher than that of the main object.

According to a fifth aspect of the invention, when the focusing unit is operated after the best focus range detecting unit automatically sets the position of the AF frame, the best focus range detecting unit may detect the best focus range from the imaging screen showing the focus result of the focusing unit again, and the AF frame automatic setting unit may move the previously set position of the AF frame to the redetected best focus range.

According to the above-mentioned structure, it is possible to easily set the AF frame to a position desired by the cameraman.

According to a sixth aspect of the invention, when the object on the screen is moved after the position of the AF frame is set on the basis of the focus result of the focusing unit, the AF frame automatic setting unit may automatically move the AF frame to follow the movement of the object.

According to the above-mentioned structure, when the object is moved on the screen after the cameraman stops a manual operation to fix the AF frame at that position, it is possible to move the AF frame to follow the movement of the object. Therefore, it is easy to perform focusing.

As described above, according to the above-mentioned aspects of the invention, it is possible to automatically and easily set an AF frame to a focus range desired by a cameraman in an AF system.

DESCRIPTION OF THE PREFERRED EMBODIMENTS

Hereinafter, an auto focus device according to an embodiment of the invention will be described with reference to the accompanying drawings.

Figure 1:
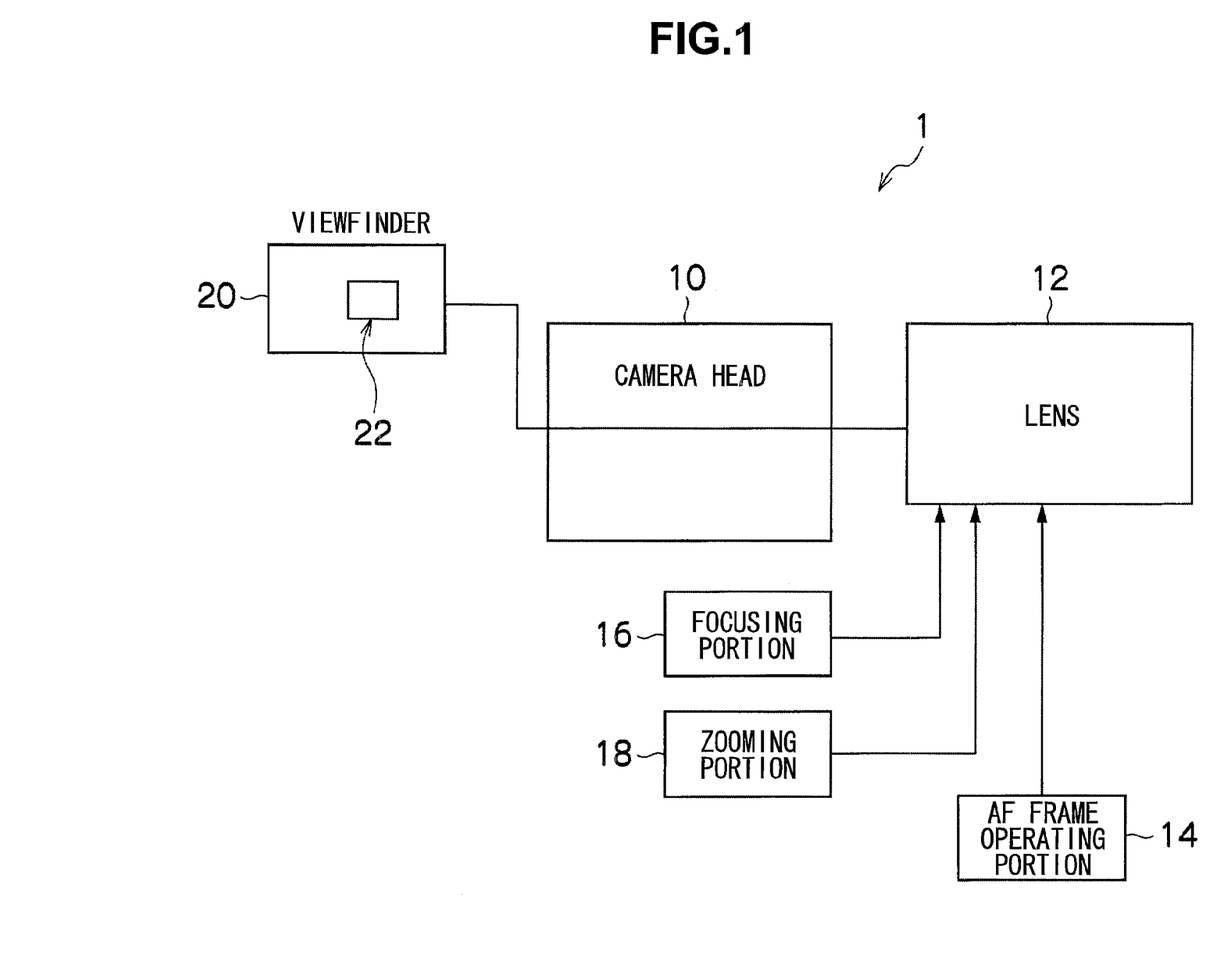
FIG. 1 is a block diagram illustrating the main structure of a television camera system using an auto focus device according to an embodiment of the invention.

FIG. 1 is a block diagram illustrating the main structure of a television camera system using an auto focus device according to an embodiment of the invention.

As shown in FIG. 1, a television camera system 1 according to this embodiment includes a camera head (camera body) 10, a lens (lens device) 12, an AF frame operating unit 14, a focusing unit 16, a zooming unit 18, and a viewfinder 20.

The camera body 10 includes a video imaging device (for example, a CCD) that captures a broadcasting video and outputs video signals of a predetermined format or records the captured video on a recording medium. The lens device 12 including an imaging lens (optical system) is mounted so as to be removable on a lens mounting portion of the camera body 10.

The image of an object is formed on an imaging surface of the imaging device of the camera body 10 by the optical system of the lens device 12, and the image of the object is sequentially converted into electric signals by the imaging device. Then, a signal processing circuit performs predetermined signal processing on the signal output from the imaging device. In this way, the image (video) of the object is captured, and the video signals thereof are generated.

Although not shown in the drawings, the imaging lens of the lens device 12 includes movable portions for adjusting imaging conditions, such as a focus lens group, a zoom lens group, and an aperture diaphragm, as components and the movable portions are electrically driven by a motor (servo mechanism). For example, the focus lens group or the zoom lens group is moved along an optical axis. The focus lens group is moved to adjust focus (object distance), and the zoom lens group is moved to adjust a focal length (zoom ratio).

As in this embodiment, in an auto focus system, at least the focus lens group may be electrically driven, and the other movable portions may be only manually driven. When a predetermined movable portion is electrically driven according to instructions from an operator (cameraman), the operation of the movable portion is controlled on the basis of a control signal output from an operating unit (not shown) (for example, an operating unit of a controller connected to the lens device 12) operated by the operator. However, a detailed description thereof will be omitted.

The AF frame operating unit 14, the focusing unit 16, and the zooming unit 18 are connected to connectors (not shown) of the lens device 12.

The AF frame operating unit 14 is an operating unit that sets or changes, for example, the position of an AF area, which will be described in detail below. The focusing unit 16 is an operating unit that performs a general operation related to focusing or an operation related to the AF area. The zooming unit 18 is an operating unit that performs an operation related to zooming.

Although not shown in the drawings, the lens device 12 is provided with, for example, a lens CPU that controls the overall operation of the lens device 12, an AF processing unit that performs an auto focus process, and an imaging circuit for AF. The imaging circuit for AF is provided in the lens device 12 in order to acquire a video signal for AF processing, and includes an imaging device (for example, a CCD) or a processing circuit that outputs the output signal of the imaging device as a video signal of a predetermined format. The imaging device of the imaging circuit for AF is referred to as an imaging device for AF. The video signal output from the imaging circuit for AF is a brightness signal. Object light branched from the object light incident on the imaging device of the camera body 10 by, for example, a half mirror that is arranged on the optical path of the imaging lens is focused on the imaging surface of the imaging device for AF. The imaging range and the object distance (the distance to an object in focus) in the imaging area of the imaging device for AF are equal to the imaging range and the object distance in the imaging area of the imaging device of the camera body 10. The image of the object captured by the imaging device for AF is identical to that captured by the imaging device of the camera body 10. The two imaging ranges do not need to be completely equal to each other. For example, the imaging range of the imaging device for AF may include the imaging range of the imaging device of the camera body 10.

The AF processing unit of the lens device 12 acquires a video signal from the imaging circuit for AF, and calculates a focus evaluation value indicating the level of the contrast of the image of the object on the basis of the video signal. For example, high-frequency component signals are extracted from the video signals obtained by the imaging device for AF by a high pass filter, and among the high-frequency component signals, signals that correspond to one screen (one frame) and are in a range corresponding to an AF area to be subjected to AF processing are integrated. In this way, the integrated value corresponding to each screen indicates the level of the contrast of the image of the object, and is given as a focus evaluation value to the lens CPU.

The lens CPU of the lens device 12 acquires the information of an AF frame (AF frame information) indicating the range (outline) of the AF area from the AF frame operating unit 14, and designates as the AF area the range of the AF frame designated by the AF frame information to the AF processing unit. Then, the lens CPU acquires the focus evaluation value calculated by the image (video signal) in the AF area from the AF processing unit. In this way, whenever video signals corresponding to one screen are acquired from the imaging circuit for AF (whenever the AF processing unit calculates the focus evaluation value), the lens CPU acquires the focus evaluation value from the AF processing unit, and controls the focus lens group such that the acquired focus evaluation value is the maximum (the largest), that is, the contrast of the image of the object in the AF area is the maximum. For example, generally, a hill-climbing method has been known as the method of controlling the focus lens group on the basis of the focus evaluation value. In the hill-climbing method, the focus lens group is moved in a direction in which the focus evaluation value increases, and when a point where the focus evaluation value starts to decrease is detected, the focus lens group is set to the point. In this way, the imaging device is automatically focused on the object in the AF frame.

In addition, the viewfinder 20 is mounted to the camera body 10. The camera body 10 transmits the video signals to the viewfinder 20 and a real-time image (video) captured by the camera body 10 is displayed on the screen of the viewfinder 20. In addition, for example, the information of the AF frame 32 indicating the range of the AF area to be subjected to auto focus (AF) may be displayed on the screen of the viewfinder 20.

Figure 2:
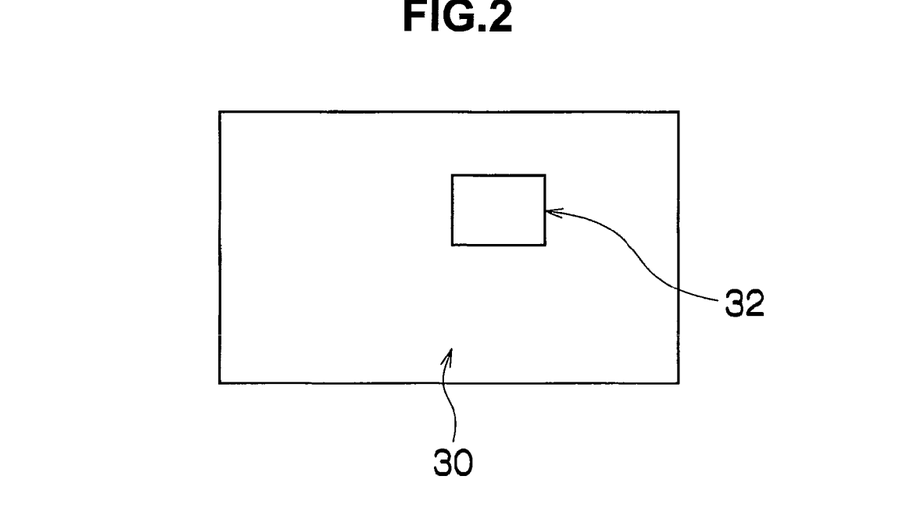
FIG. 2 is a diagram illustrating an example of an AF frame.

FIG. 2 shows an example of the AF frame. In FIG. 2, reference numeral 30 denotes the imaging range, which is the range of the object or the image of the object effectively captured by the imaging device for AF of the lens device 12. As shown in FIG. 2, the AF frame 32 indicating the AF area to be subjected to AF in the imaging range 30 is set as, for example, a rectangular range.

The position, size, or shape of the AF frame 32 in the imaging range 30 can be changed by the AF frame information given from the AF frame operating unit 14. In addition, when the image of the object (captured image) captured by the imaging device of the camera body 10 is reproduced and displayed on the screen of the viewfinder 20, the imaging range 30 shown in FIG. 2 corresponds to the screen range of the captured image.

Figure 3:
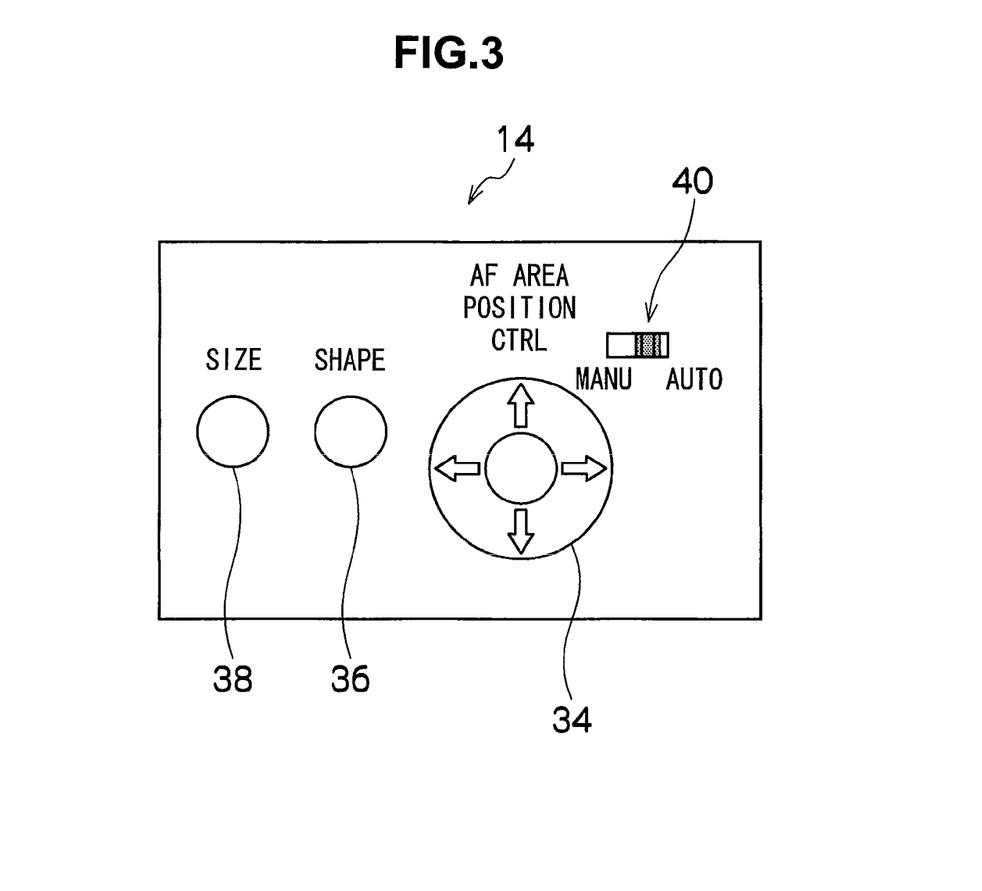
FIG. 3 is a diagram illustrating an example of an AF frame operating unit.

FIG. 3 shows an example of the AF frame operating unit 14. FIG. 3 is a plan view illustrating the AF frame operating unit 14.

As shown in FIG. 3, the AF frame operating unit 14 includes a joystick 34, an AF frame shape setting switch 36, an AF frame size setting switch 38, and an MF-AF switch 40 that performs switching between manual focus (MF) and auto focus (AF).

The joystick 34 is an operating member that designates the position of the AF frame in the imaging screen. The AF frame shape setting switch 36 is a switch that sets the shape of the AF frame. The shape of the AF frame is not necessarily limited to the rectangular shape shown in FIG. 2. Whenever the AF frame shape setting switch 36 is pressed, various shapes of AF frames are displayed on the screen of the viewfinder 20. The AF frame size setting switch 38 is for setting the size of the AF frame. Whenever the AF frame size setting switch 38 is pressed, the size of the AF frame displayed on the screen of the viewfinder 20 is changed.

The MF-AF switch 40 is a slide switch for switching between manual focus (MF) and auto focus (AF).

Figure 4:
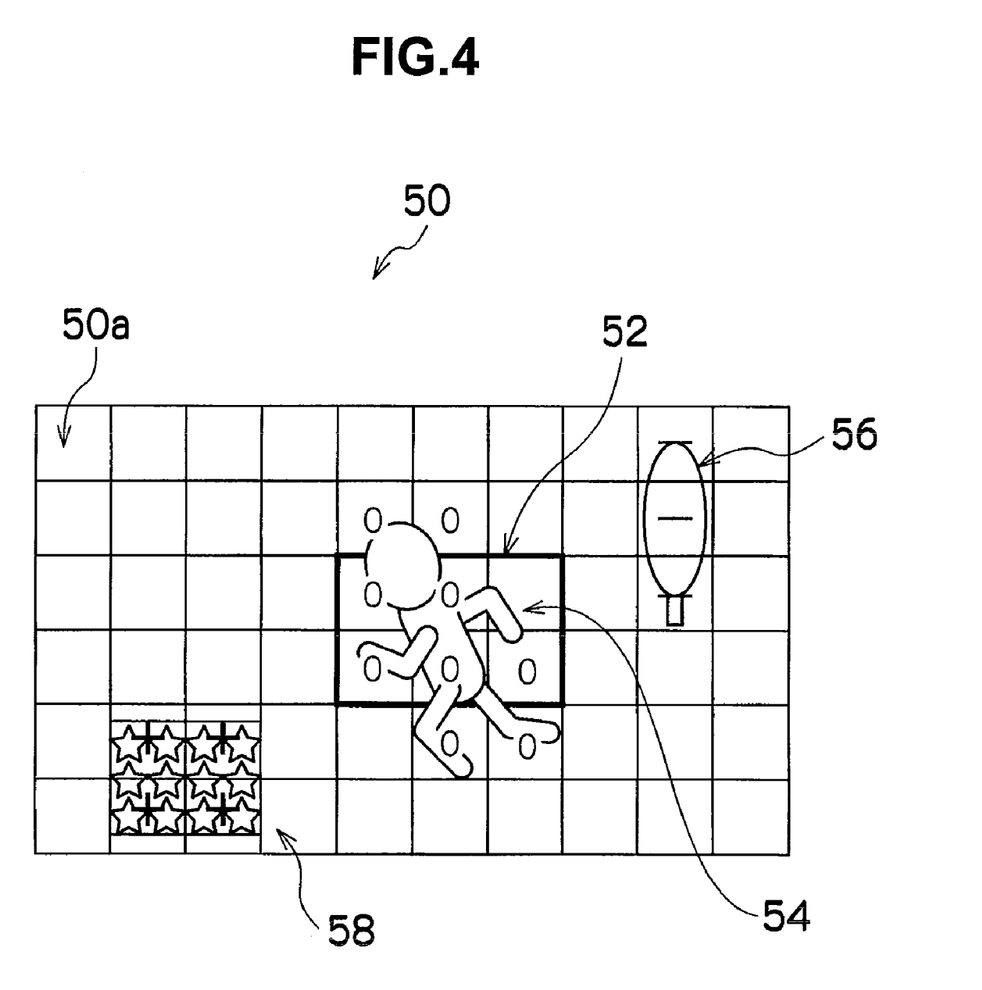
FIG. 4 is a diagram illustrating an imaging screen.

FIG. 4 is a diagram illustrating the imaging screen.

As shown in FIG. 4, an imaging screen 50 is divided into a plurality of regions 50a. In addition, a bold rectangle represented by reference numeral 52 is an AF frame indicating the AF area in the imaging screen 50.

The auto focus device according to this embodiment detects the focus state of each region 50a in the imaging screen 50. As described above, the focus state is detected by calculating the focus evaluation value of each of the regions 50a.

In FIG. 4, the symbol '0' is displayed in the region 50a including an object in the best focus state, the symbol '+' is displayed in the region 50a including an object in front focus, and the symbol '−' is displayed in the region 50a including an object in back focus.

The region 50a that does not include any of the symbols '0', '+', and '−' is out of focus, or it does not include any object.

The operation of the auto focus device according to this embodiment will be described below. In FIG. 4, for example, the operator operates the joystick 34 to set the AF frame 52 at the position of a person 54 that is the main object disposed at the center of the screen.

In this case, when the MF-AF switch 40 of the AF frame operating unit 14 is moved to an AF side, auto focus is performed such that the person 54 that is the main object in the AF frame 52 is in the best focus.

A group of the regions 50a including the person 54 that is an object in the vicinity of the AF frame 52 is in the best focus, and '0' is displayed in the group of the regions 50a. In addition, a group of the regions 50a including a tree 56, which is an object on the right rear side in the imaging screen 50, is in back focus, and '−' is displayed in the group of the regions. An object 58 disposed on the left front side in the imaging screen 50, which is a high-contrast object (for example, an object including a plurality of colors having a brightness difference therebetween), is in front focus, and '+' is displayed in the object 58. The focus state of each region 50a in the imaging screen 50 is detected by the lens CPU of the lens device 12, and then stored in a storage unit such as a RAM.

Figure 5:
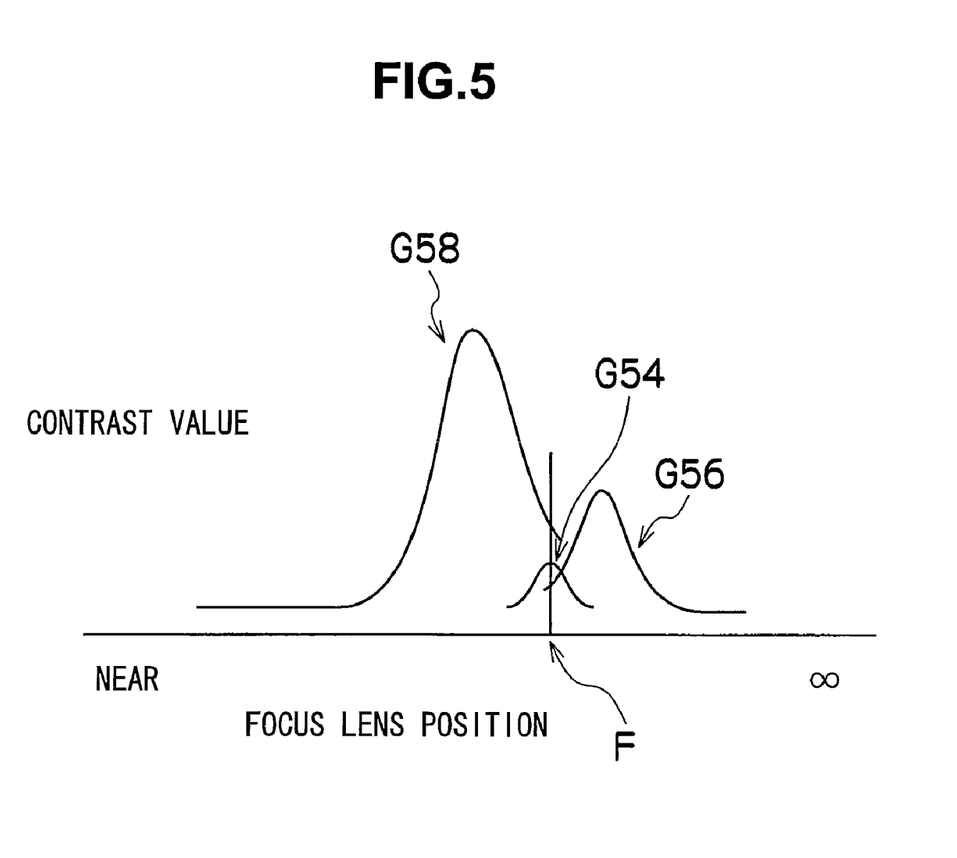
FIG. 5 is a graph schematically illustrating the focus state of each object in the imaging screen shown in FIG. 4.

FIG. 5 is a graph schematically illustrating the focus states of the objects (the person 54, the tree 56, and the high-contrast object 58) in the imaging screen 50 shown in FIG. 4.

In FIG. 5, the horizontal axis indicates the focus position of the focus lens group (the left indicates a near side, and the right indicates infinity (∞)) and the vertical axis indicates the focus evaluation value. In particular, a character F indicates the current position of the focus lens.

In FIG. 5, the focus evaluation values of the three objects (the person 54, the tree 56, and the high-contrast object 58) detected from each region 50a in the imaging screen 50 are represented by graphs G54, G56, and G58.

As shown in FIG. 5, the focus evaluation value of the person 54 that is the main object is less than those of the other objects (the tree 56 and the high-contrast object 58). It is possible to track the AF frame 52 such that the person 54 that is the main object is in the best focus by detecting the focus state of each region 50a (for example, the best focus, front focus, rear focus, or out of focus).

Next, the operation of this embodiment will be described with reference to a flowchart shown in FIG. 6.

In this embodiment, when the cameraman adjusts focus (manually) to bring the main object into the best focus, the system detects the focus range from a plurality of regions divided from the imaging range, and automatically sets the position of the AF frame such that the center of the range composed of the detected regions is aligned with the center of the AF area. When the position of the AF frame that is automatically set is not aligned with the position intended by the cameraman, the cameraman continuously performs the focusing operation until the AF frame is set to the intended position.

Figure 6:
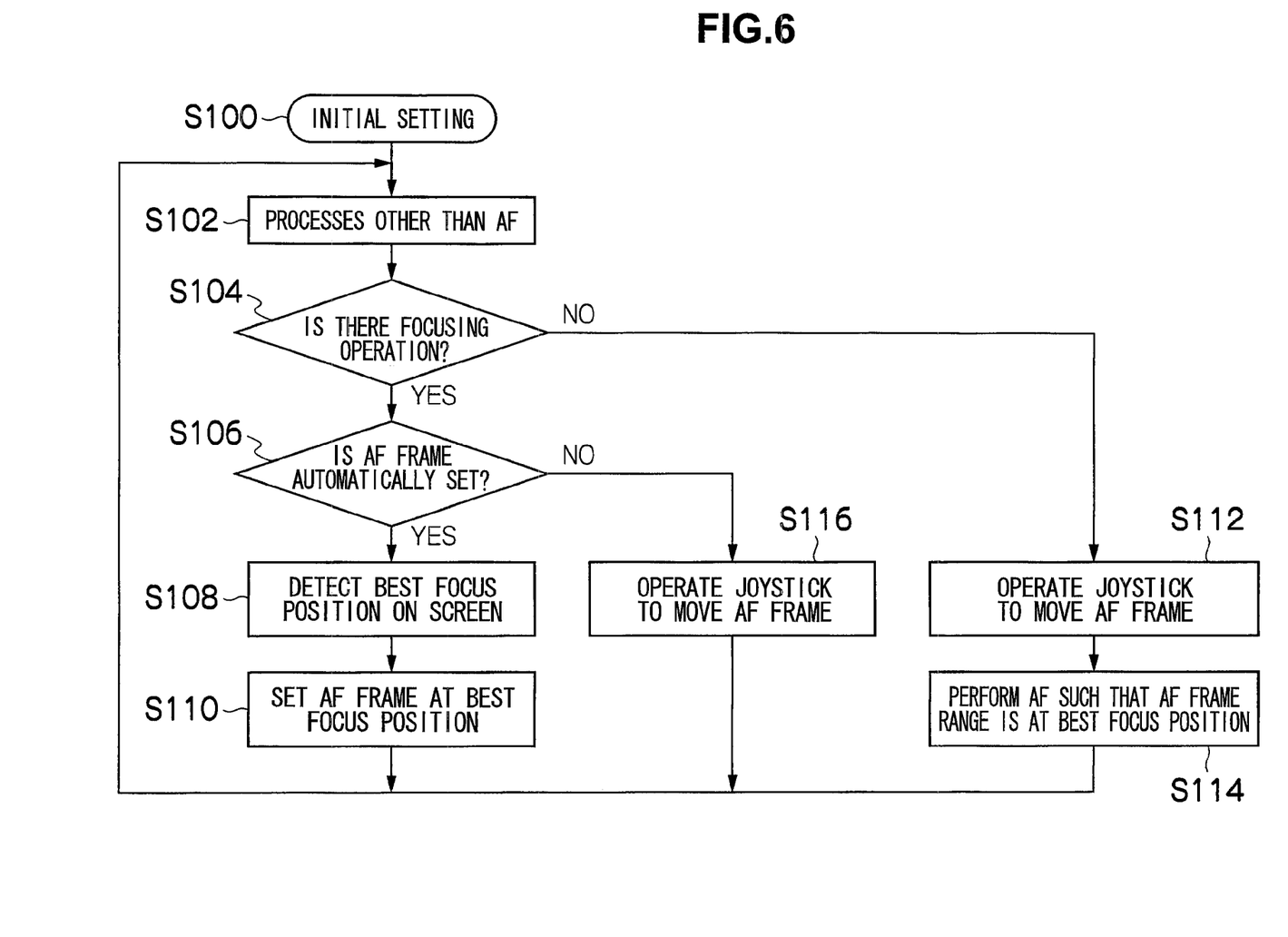
FIG. 6 is a flowchart illustrating an example of a mode that performs an AF operation when there is no manual focus operation, and shows the operation of this embodiment.

FIG. 6 is a flowchart illustrating an example of a mode that performs an AF operation when there is no manual focus operation.

In FIG. 6, first, initial setting is performed in Step S100, and processes other than AF are performed in Step S102.

Then, in Step S104, the lens CPU of the lens device 12 determines whether the cameraman performs a manual focus operation on the basis of the signal received from the focus operating unit 16.

If it is determined in Step S104 that the cameraman performs the manual focus operation, it is determined in Step S106 whether the AF frame setting mode is the automatic mode. The lens CPU of the lens device 12 determines whether the MF-AF switch 40 of the AF frame operating unit 14 is set to MF or AF.

If it is determined that the AF frame setting mode is the automatic mode, in Step S108, the position on the screen that is in the best focus according to the focusing operation of the cameraman is detected. As described above, the focus state of each of the regions divided from the imaging range is detected by the lens CPU of the lens device 12. In this way, the position on the screen that is in the best focus '0' according to the focusing operation of the cameraman is detected.

Then, in Step S110, for example, as shown in FIG. 4, the lens CPU of the lens device 12 automatically sets the AF frame 52 on the basis of the detected best focus position on the screen. In this way, the display of the set AF frame 52 is maintained, and when the best focus position is moved, the AF frame 52 is also moved to correspond to the movement of the best focus position. Then, the process returns to Step S102.

The size or shape of the AF frame may be automatically determined according to the best focus region. Alternatively, the AF frame may have a predetermined size and shape, and be moved such that the center of the best focus region is aligned with the center of the AF frame.

If it is determined in Step S104 that the cameraman does not perform the manual focus operation, in Step S112, the cameraman operates the joystick 34 of the AF frame operating unit 14 to move the AF frame (which is displayed on the imaging screen until that time) to a desired position. In this case, the AF frame operating unit 14 may be used to change the size or shape of the AF frame as well as the position of the AF frame.

As such, when the cameraman moves the AF frame to determine the new position of the AF frame, in Step S114, AF is performed such that the range of the AF frame (AF area) is in the best focus. Then, the process returns to Step S102 again.

In Step S106, the cameraman performs a manual focus operation to bring the main object into focus. However, when the AF frame setting mode is not the automatic mode, that is, when the MF-AF switch 40 of the AF frame operating unit 14 is set to MF, it is necessary to manually set the AF frame. Therefore, in Step S116, the cameraman operates the joystick 34 of the AF frame operating unit 14 to set the AF frame. Then, the process returns to Step S102 again.

As such, in this embodiment, basically, in the process from Step S100 to Step S110, when the cameraman manually focuses the camera on a desired object, the system detects the best focus position of the object and automatically sets the AF frame.

That is, since the cameraman performs a general focusing operation, it is easy to perform the focusing operation. Therefore, when the range focused by the focusing operation of the cameraman is detected and the position of the AF frame is set such that the center of the focus range is aligned with the center of the AF area (AF frame), it is easy to set the position of the AF frame.

As in Step S112, when the cameraman uses, for example, the joystick to operate the AF frame, the manual operation has priority even though the AF frame setting mode is the automatic mode.

In this way, when the position of the AF frame that is automatically set is not aligned with the position intended by the cameraman, it is possible to continuously perform the focusing operation until the AF frame is set to the intended position.

When there is a plurality of candidate positions of the AF frame, the AF frame may be automatically set to a position close to the center of the screen, a position having a large focusing area, or a position having high contrast. Alternatively, the AF frame may be automatically set to a position away from the center of the screen, a position having a small focusing area, or a position having low contrast. In addition, any of the positions may be selected.

Further, priority may be given according to the direction of the focusing operation. For example, when there are two candidates having similar conditions, the priorities for selecting the candidate positions of the AF frame during a focusing operation from infinity (∞) to the near side and during a focusing operation from the near side to infinity (∞) may be different from each other.

The area or shape of the AF area may be automatically set according to the focusing area.

In order to manually set the position of the AF frame, as described above, a touch-panel-type viewfinder 20 may be provided and the cameraman may operate the touch-panel-type viewfinder 20, in addition to operating the joystick 34 of the AF frame operating unit 14. In this case, when the cameraman performs a manual focus operation and touches the best focus position, the AF frame may be automatically displayed at the touch position.

The focusing unit 16 is a focusing member that is manually operated by the cameraman, and includes a focus demand that remotely controls the lenses and a focus ring provided in a lens barrel.

When an object is moved after the AF frame is automatically moved to the object manually focused by the cameraman, the AF frame may automatically follow the movement of the object.

That is, when the cameraman stops the manual operation, the AF frame is fixed at that position, and an AF operation is performed on an object in the range. If the object is moved on the screen, the AF frame automatically follows the movement of the object. Next, an example of this operation will be described.

Figure 7:
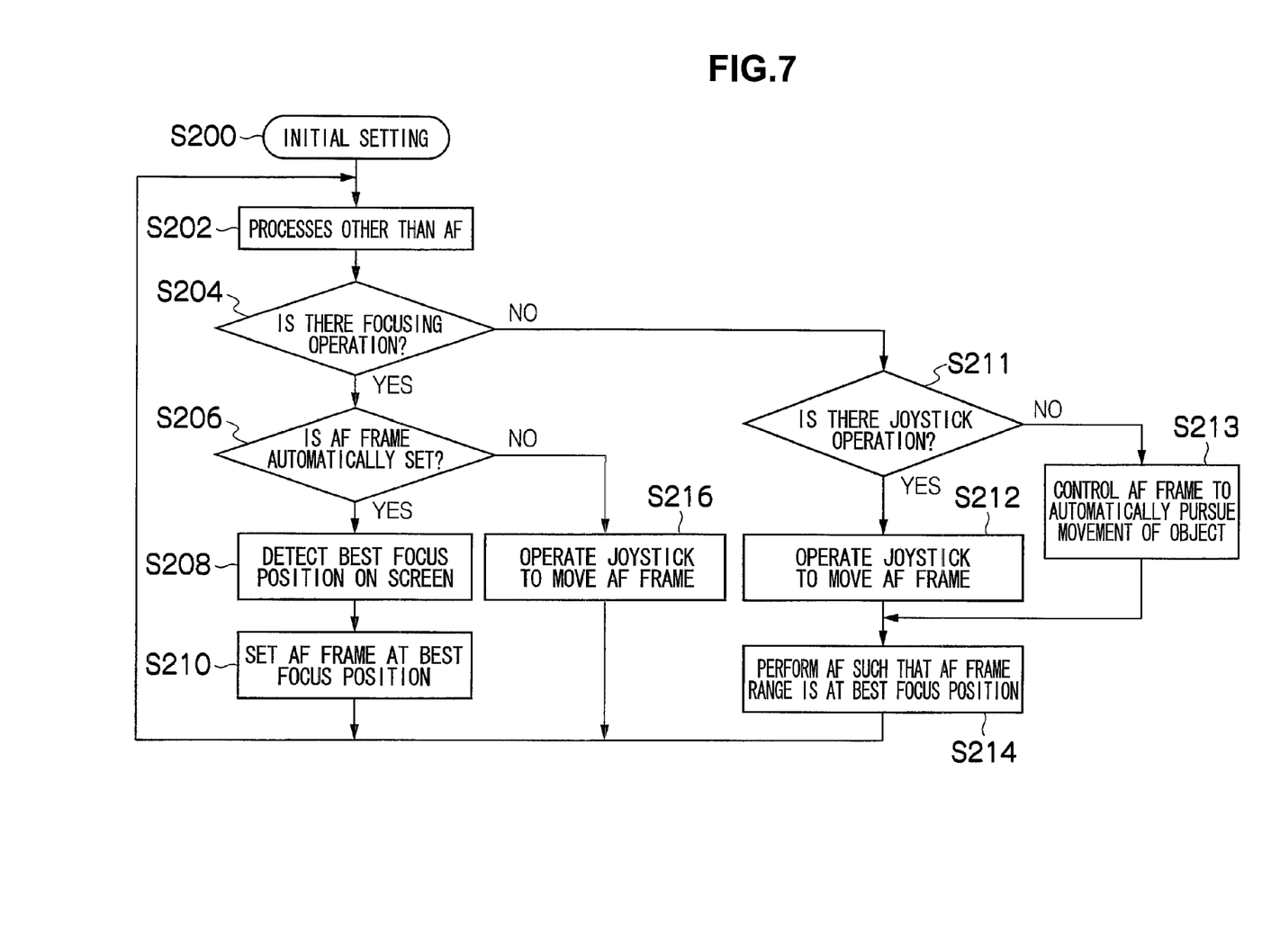
FIG. 7 is a flowchart illustrating an example of a mode that automatically moves an AF frame to follow the movement of an object when the object is moved on the screen after a cameraman stops a manual operation.

FIG. 7 is a flowchart illustrating an example of a mode which automatically moves the AF frame to follow the movement of an object when the object is moved on the screen after the cameraman stops a manual operation.

The flowchart shown in FIG. 7 is basically the same as that shown in FIG. 6. In the flowchart shown in FIG. 7, a process of controlling the AF frame to automatically follow the movement of an object when the object is moved on the screen after the cameraman stops a manual operation is added to the flowchart shown in FIG. 6.

First, in FIG. 7, initial setting is performed in Step S200, and processes other than AF are performed in Step S202. In Step S204, it is determined whether the cameraman performs a manual focus operation.

If it is determined that the cameraman performs the manual focus operation, in Step S206, it is determined whether the AF frame setting mode is an automatic mode. If it is determined that the AF frame setting mode is the automatic mode, in Step S208, the best focus position on the screen is detected. In Step S210, the AF frame is set to the best focus position.

If it is determined that the AF frame setting mode is not the automatic mode, in Step S216, the cameraman operates the joystick 34 of the AF frame operating unit 14 to set the AF frame.

Then, in any case, the process returns to Step S202. The process up to the above-mentioned steps is the same as that in FIG. 6.

If it is determined in Step S204 that the cameraman does not perform the manual focus operation, a process, which will be described below, slightly different from that shown in FIG. 6 is performed.

That is, if it is determined in Step S204 that the cameraman does not perform the manual focus operation, in Step S211, it is determined whether the cameraman operates the joystick 34.

If it is determined that the cameraman does not operate the joystick 34, the AF frame is fixed since the cameraman has stopped the manual operation. In Step S213, the process of controlling the AF frame to automatically follow the movement of an object starts.

Figure 8:
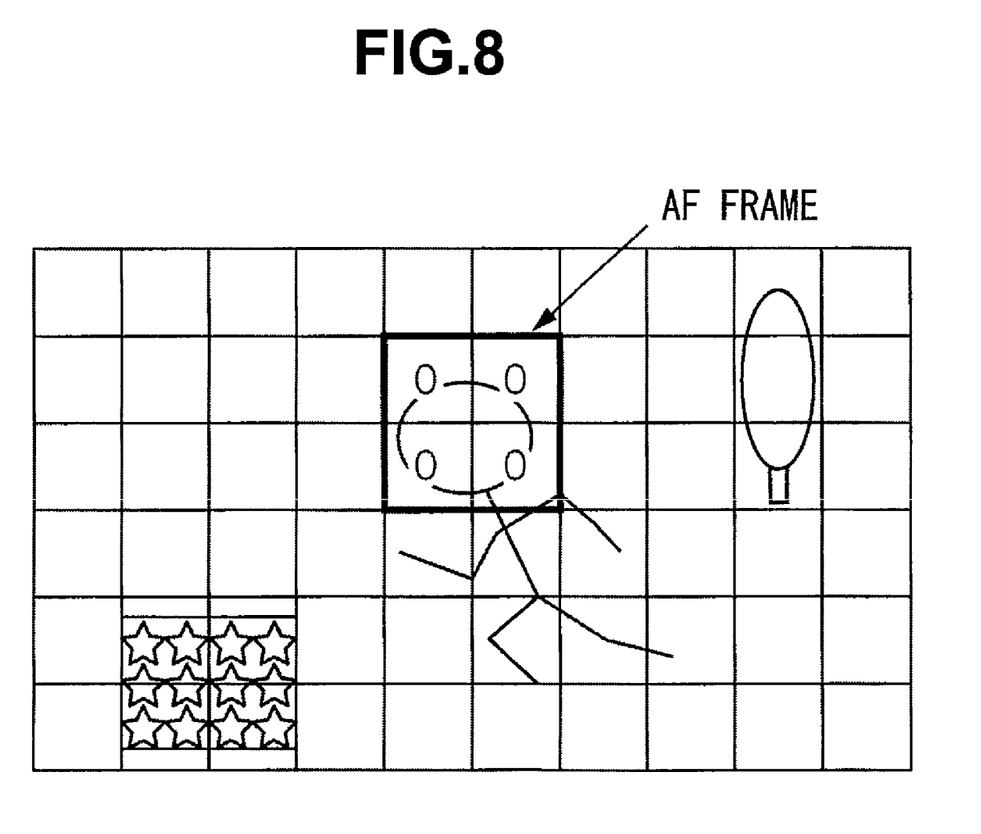
FIG. 8 is a diagram illustrating an example of automatically moving the AF frame to follow the movement of an object when the object is moved on the screen after the AF frame is fixed.

That is, for example, as shown in FIG. 8, when an object is moved on the screen, the AF frame is automatically moved to follow the movement of the object. For example, as shown in FIG. 8, the AF frame is set to the face of the object, and the face authentication of the object is performed on the basis of pattern matching or face images that have been registered in advance. Then, the AF frame automatically follows the movement of the object on the screen. Then, the process proceeds to Step S214 to perform AF such that the range of the AF frame is at the best focus position.

If it is determined in Step S211 that the cameraman does not operate the joystick 34, in Step S212, the cameraman operates the joystick 34 to move the AF frame. In Step S214, AF is performed such that the range of the AF frame is at the best focus position.

Thereafter, the process returns to Step S202 again, and the above-mentioned steps are repeatedly performed.

Although the auto focus device according to the embodiment of the invention has been described above, the invention is not limited thereto. Various modifications and changes of the invention can be made without departing from the scope and spirit of the invention.

What is claimed is:

1. An auto focus device comprising:
   a focusing unit that performs focusing on an imaging screen of a camera;
   a best focus range detecting unit that detects a best focus range from the imaging screen showing the focus result of the focusing unit; and
   an AF frame automatic setting unit that automatically sets the position of an AF frame indicating the range of an AF area, which is a target range focused by auto focus in the imaging screen, in the detected best focus range, wherein when a user manually focuses the camera on a desired object, the AF frame is automatically set by the AF frame automatic setting unit based on the detected best focus range.

2. The auto focus device according to claim 1,
   wherein the best focus range detecting unit divides the imaging screen into a plurality of regions and acquires the focus state of each of the regions, thereby detecting the best focus range.

3. The auto focus device according to claim 2,
   wherein the focus state of each of the regions includes a best focus state, a front focus state, a rear focus state, and an out-of-focus state.

4. The auto focus device according to claim 2,
   wherein an imaging device captures object light for detecting the focus state that is separated from object light incident on an imaging lens and generates a video signal, and
   the best focus range detecting unit acquires the focus state on the basis of a focus evaluation value of the image of an object obtained on the basis of the video signal.

5. The auto focus device according to claim 1,
   wherein, when the focusing unit is operated after the best focus range detecting unit automatically sets the position of the AF frame, the best focus range detecting unit detects the best focus range from the imaging screen showing the focus result of the focusing unit again, and the AF frame automatic setting unit moves the previously set position of the AF frame to the redetected best focus range.

6. The auto focus device according to claim 1,
   wherein, when the object on the screen is moved after the position of the AF frame is set on the basis of the focus result of the focusing unit, the AF frame automatic setting unit automatically moves the AF frame to follow the movement of the object.

7. The auto focus device according to claim 1, wherein the AF frame is set such that the center of the focus range is aligned with the center of the AF frame.

8. The auto focus device according to claim 1,
   wherein, when there is a plurality of candidate position of the AF frame, the AF frame is set according to a given order or a selection by the user.

9. The auto focus device according to claim 1,
   wherein the area or shape of the AF frame is automatically set according to the focusing area.

\* \* \* \* \*